INVENTORS
JAMES O. EAMES
CECIL H. TAYLOR
BY
ATTORNEYS

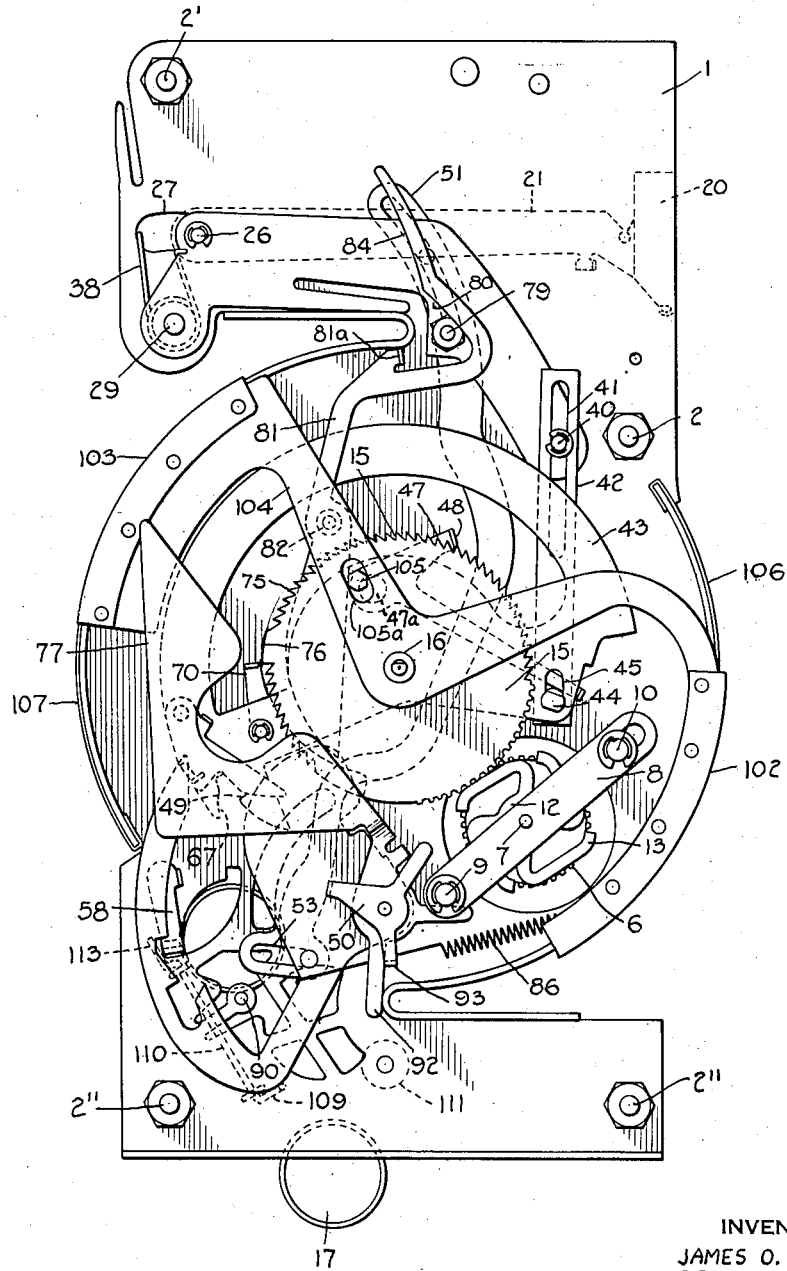

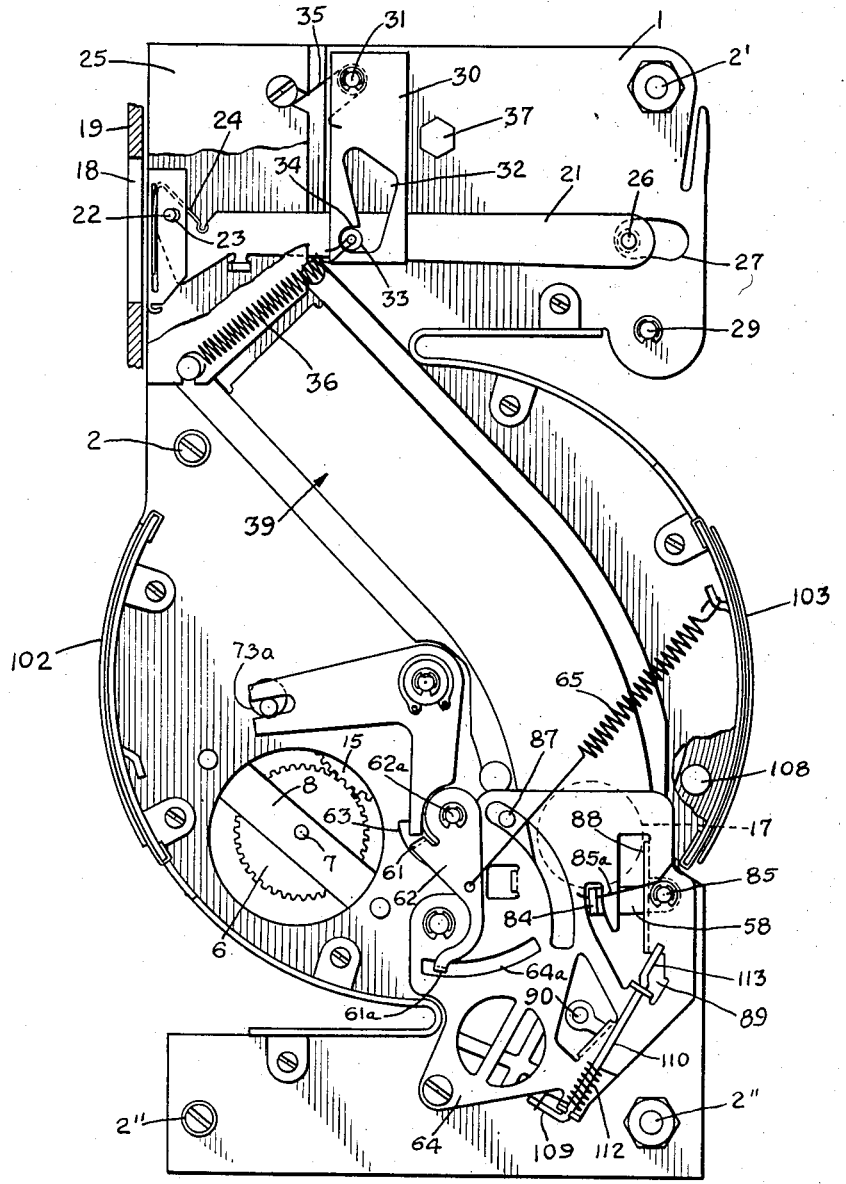

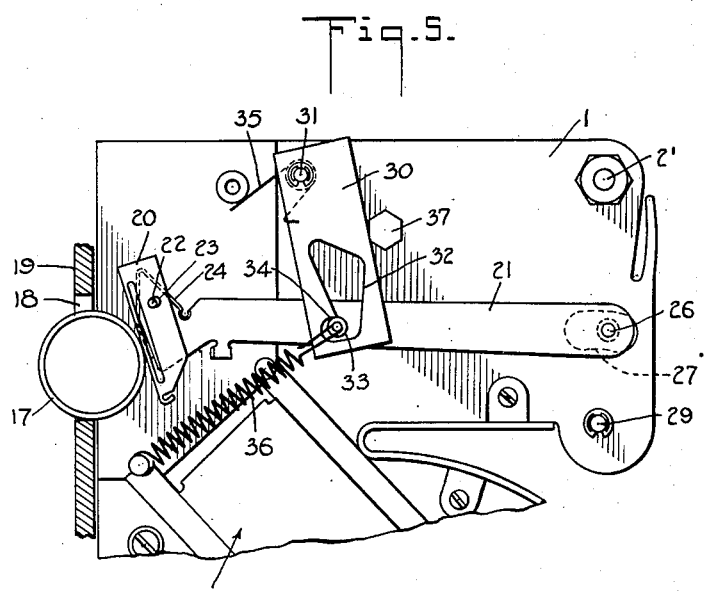
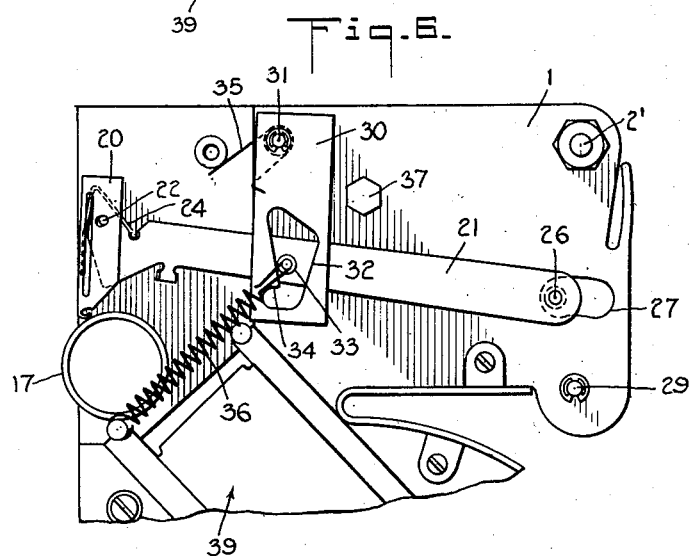
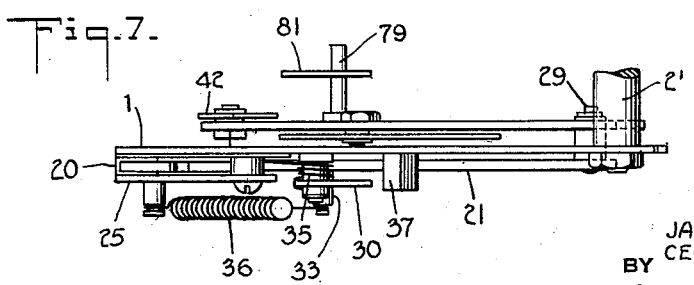

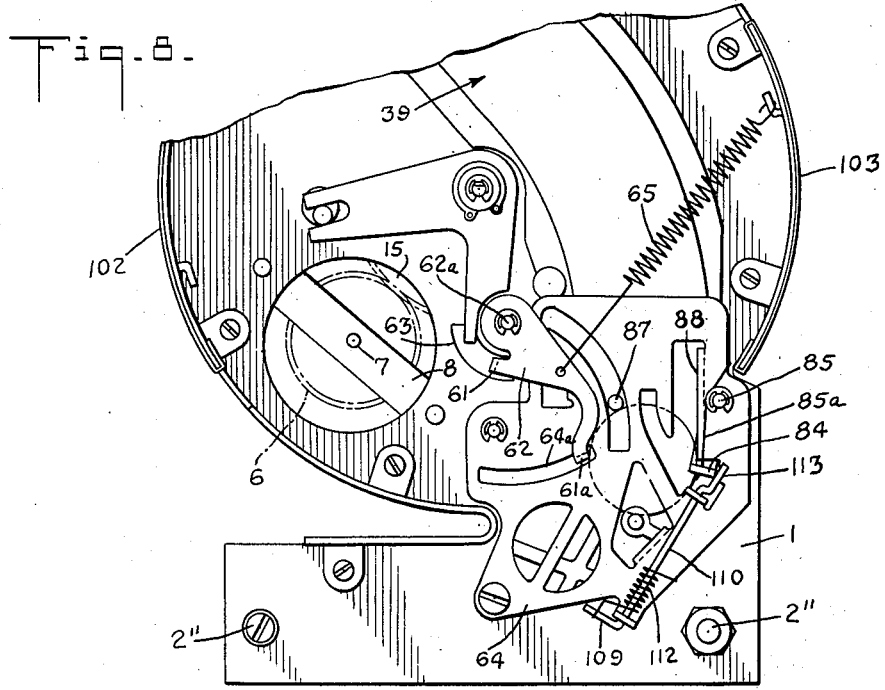

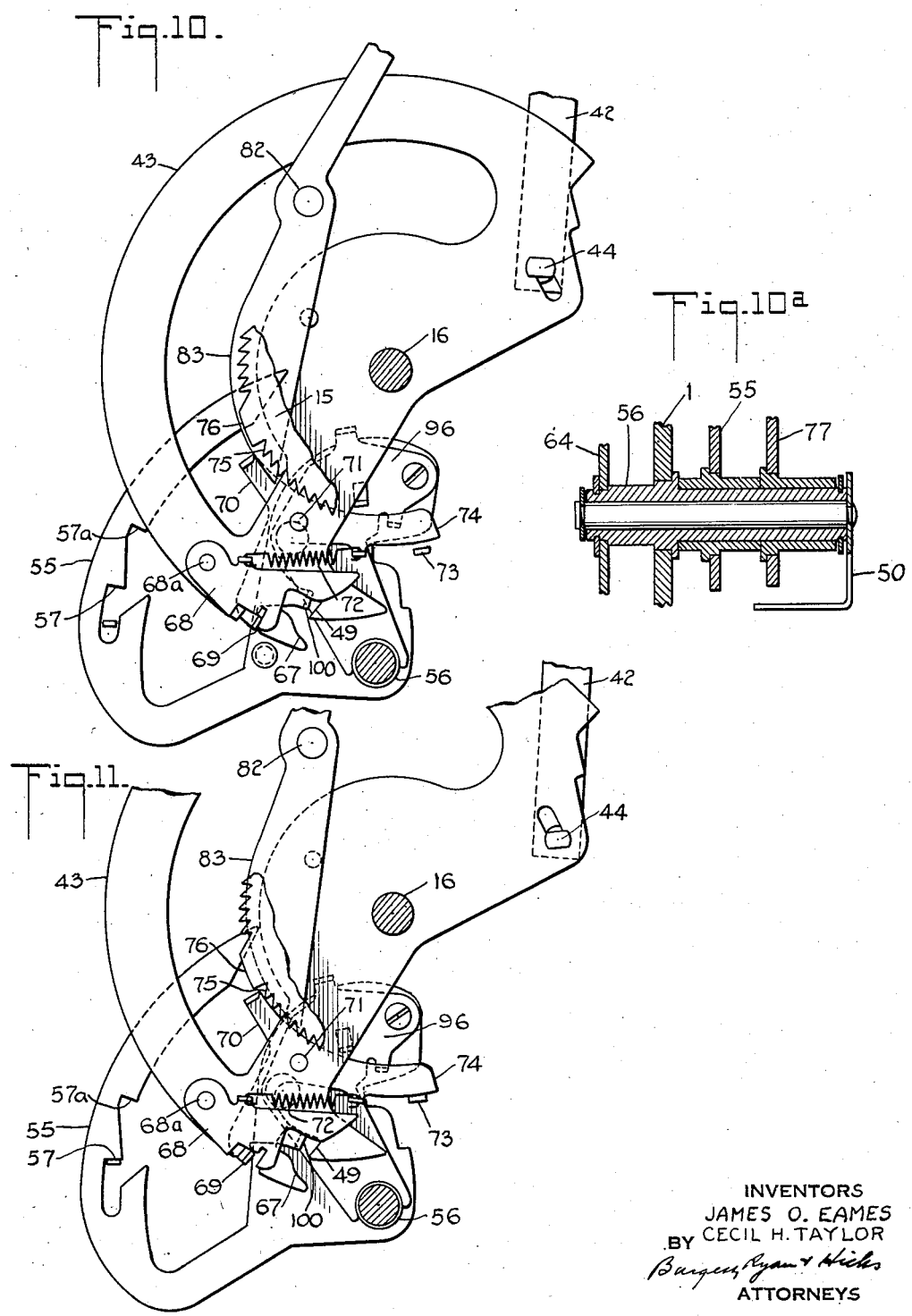

April 22, 1958

J. O. EAMES ET AL 2,831,557

PARKING METER

Filed Sept. 1, 1953

INVENTORS
JAMES O. EAMES
BY CECIL H. TAYLOR

Burgess, Ryan & Hicks
ATTORNEYS

INVENTORS
JAMES O. EAMES
CECIL H. TAYLOR
BY
ATTORNEYS

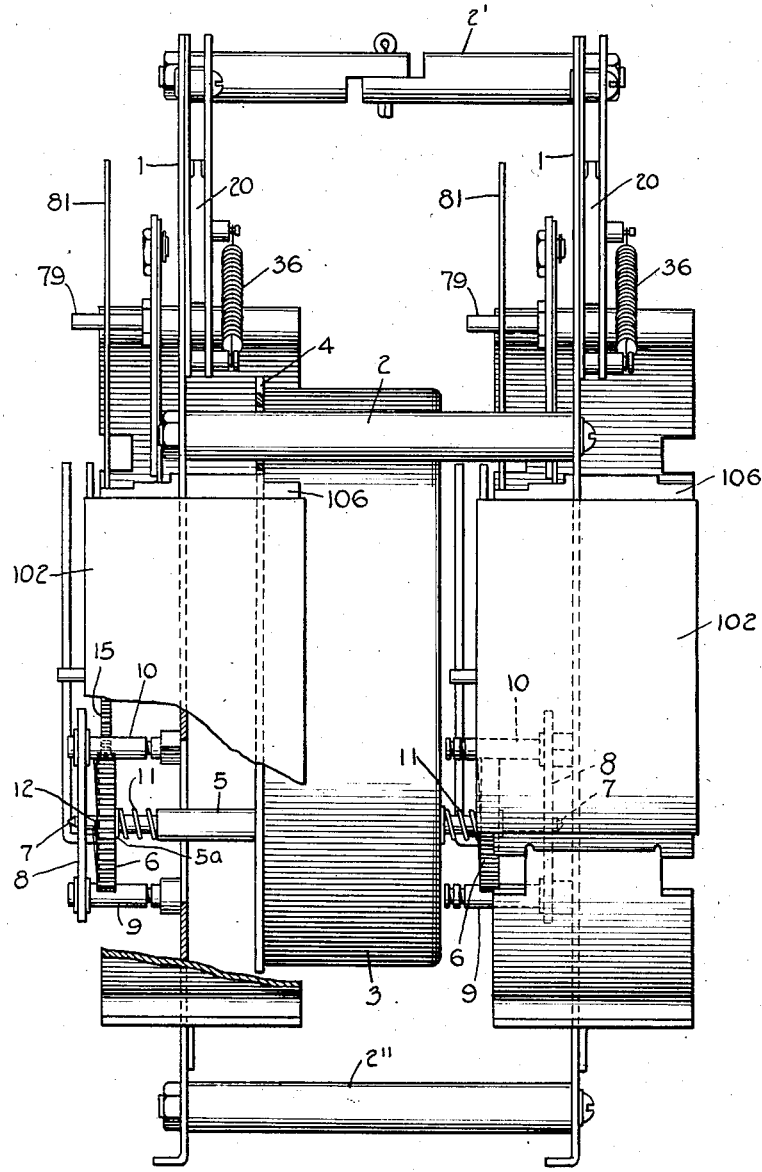

April 22, 1958  J. O. EAMES ET AL  2,831,557
PARKING METER
Filed Sept. 1, 1953  12 Sheets-Sheet 11
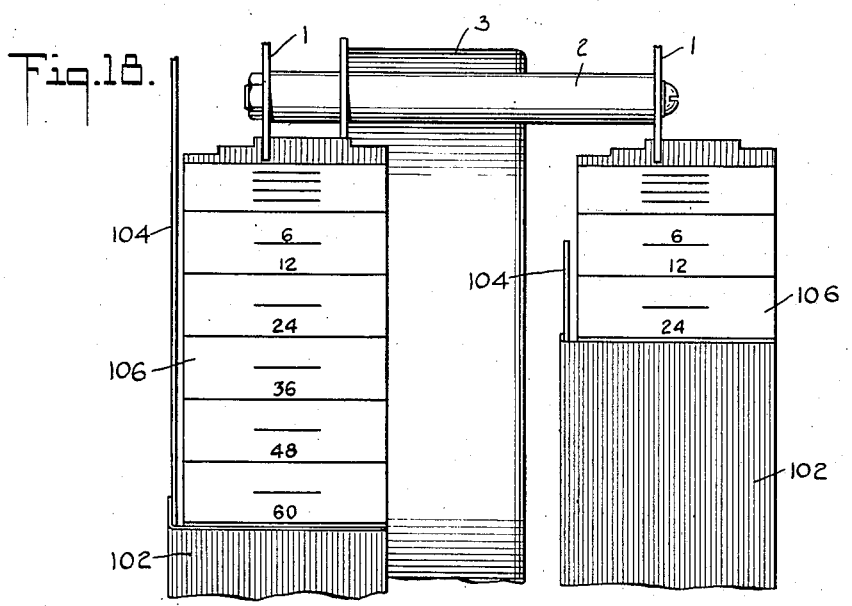
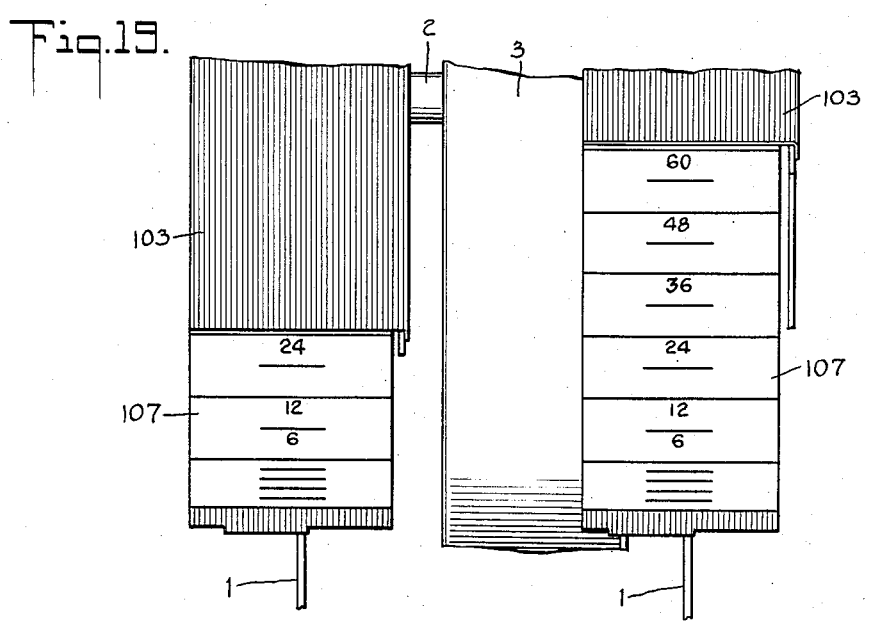
INVENTORS
JAMES O. EAMES
CECIL H. TAYLOR
BY
ATTORNEYS

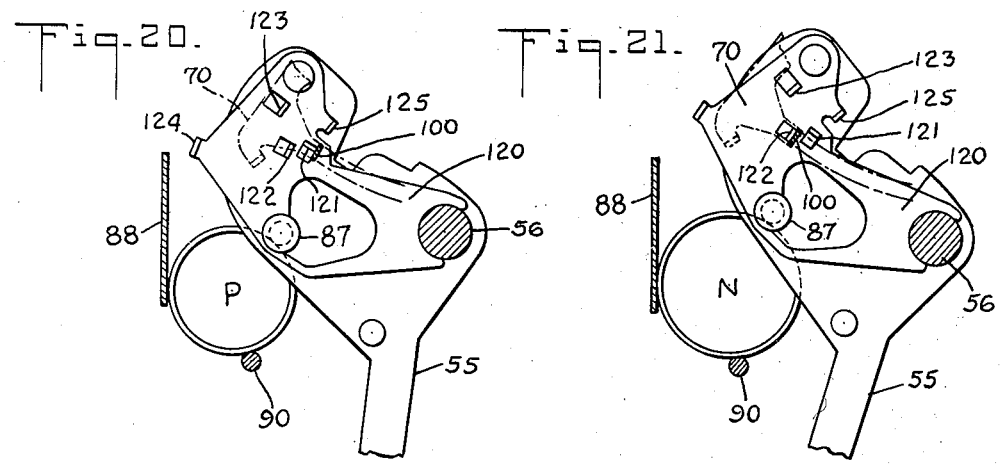
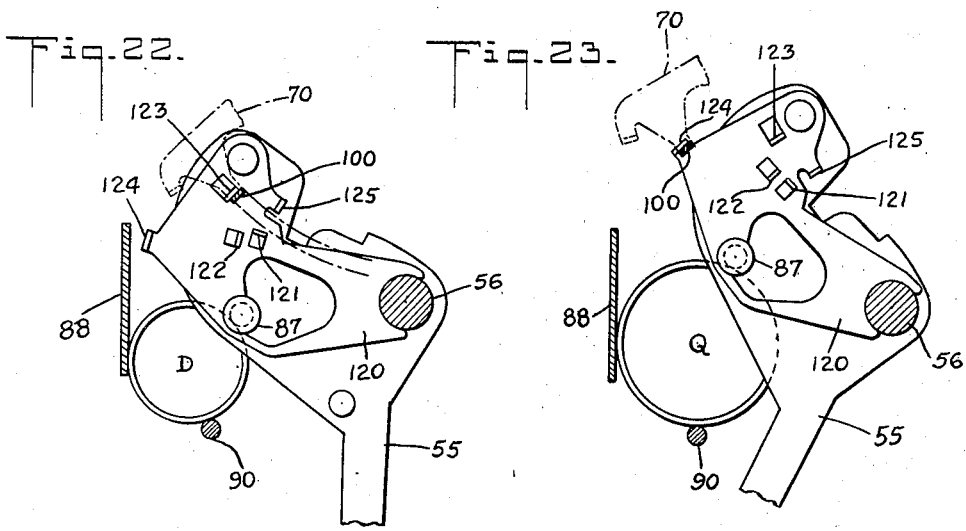
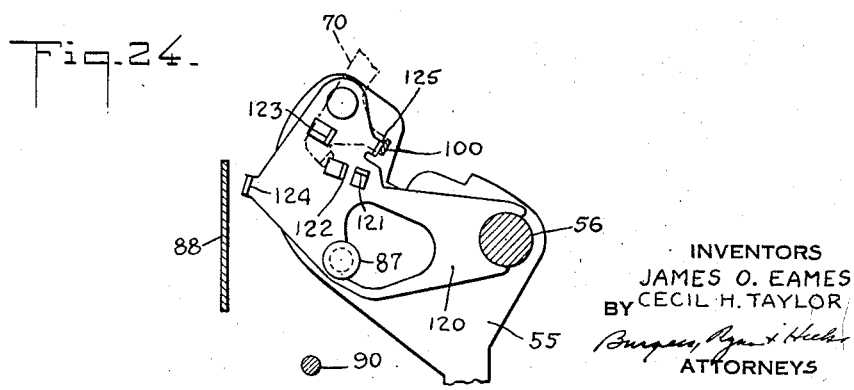

United States Patent Office 2,831,557
Patented Apr. 22, 1958

2,831,557
PARKING METER
James O. Eames, Washington, and Cecil H. Taylor, New Milford, Conn., assignors to The Michaels Art Bronze Company, Incorporated, Covington, Ky., a corporation of Kentucky
Application September 1, 1953, Serial No. 377,933
34 Claims. (Cl. 194—18)

The present invention relates to parking meters and relates more particularly to a parking meter of the automatic type.

Among the general objects of the present invention, a parking meter is provided which will accept coins of various denominations and will indicate the parking time purchased thereby in proportion to the value of the coin regardless of the dimensions or diameter of the coin. Another object of the invention is to provide a parking meter which may be operated by a specified coin or series of coins, as desired, to indicate the purchase of parking time proportional to the value of the coin deposited when such coins are deposited separately or progessively. In other words, a meter embodying the invention may be operated by a dime, a nickel or a penny or by a combination thereof such as a nickel and a penny which are deposited progressively in the meter.

Another object of the present invention is to provide a parking meter which may be readily changed to permit operation thereof by any desired coin or series of coins without making any substantial alterations in the meter mechanism itself. This avoids the necessity of constructing meters which are especially designed to meet specifications of local authorities which differ widely and enables the manufacturer of such meters to maintain an inventory of a standard meter mechanism in stock that is adequate to meet all demands as the standard meter mechanisms can be readily adapted to operate in accordance with the specifications of the authority purchasing such meters. This also simplifies manufacturing procedures and reduces costs in this respect.

A further object of the present invention is to provide a parking meter which is foolproof in its operation and which cannot readily be tampered with to obtain parking time without the deposit of a coin of appropriate value in the meter. Certain aspects of the meter mechanism illustrated and described herein are more fully described and claimed in copending application Serial No. 377,790 filed concurrently herewith now Patent No. 2,749,978 issued June 12, 1956 and reference may be made thereto.

Other objects and advantages of the present invention will be apparent and best understood from the following description and the accompanying drawings in which:

Figs. 2 and 3 are elevation views corresponding to Fig. 1 and show the meter mechanism in a different operating position;

Fig. 4 is an elevation view as seen from the rear of the meter mechanism illustrated in Fig. 2;

Fig. 5 is a fragmentary rear view of a portion of the meter mechanism illustrated in Fig. 1;

Fig. 6 is a fragmentary rear view of a portion of the meter mechanism illustrated in Fig. 1, but with the parts in different operating positions;

Fig. 7 is a top view of the portions of the meter mechanisms illustrated in Figs. 5 and 6;

Fig. 8 is a fragmentary rear view of the meter mechanism as illustrated in Fig. 3;

Fig. 9 is a fragmentary rear view of the meter mechanism corresponding to Fig. 8, but with the parts in different operating positions;

Fig. 10 is a front view of a portion of the meter mechanism illustrated in Fig. 1, but on an enlarged scale and with certain parts omitted for clarity;

Fig. 10a is a fragmentary view in vertical section of a portion of the meter mechanism;

Figs. 11 and 12 are front views corresponding to Fig. 10, but with the parts in different operating positions corresponding to Figs. 2 and 3, respectively;

Fig. 17 is a front end view illustrating a pair of meter mechanisms as shown in Fig. 1 in assembled relation;

Fig. 18 is a fragmentary end view of the meter assembly illustrated in Fig. 17 with the parts in a different position;

Fig. 19 is a fragmentary end view from the rear of a portion of the meter assembly illustrated in Fig. 17 with the parts in different operating positions; and Figs. 20 to 24 are face views showing portions of the meter mechanism illustrated in Fig. 12 in different operating positions with a modified form of stop plate.

Figure 1:
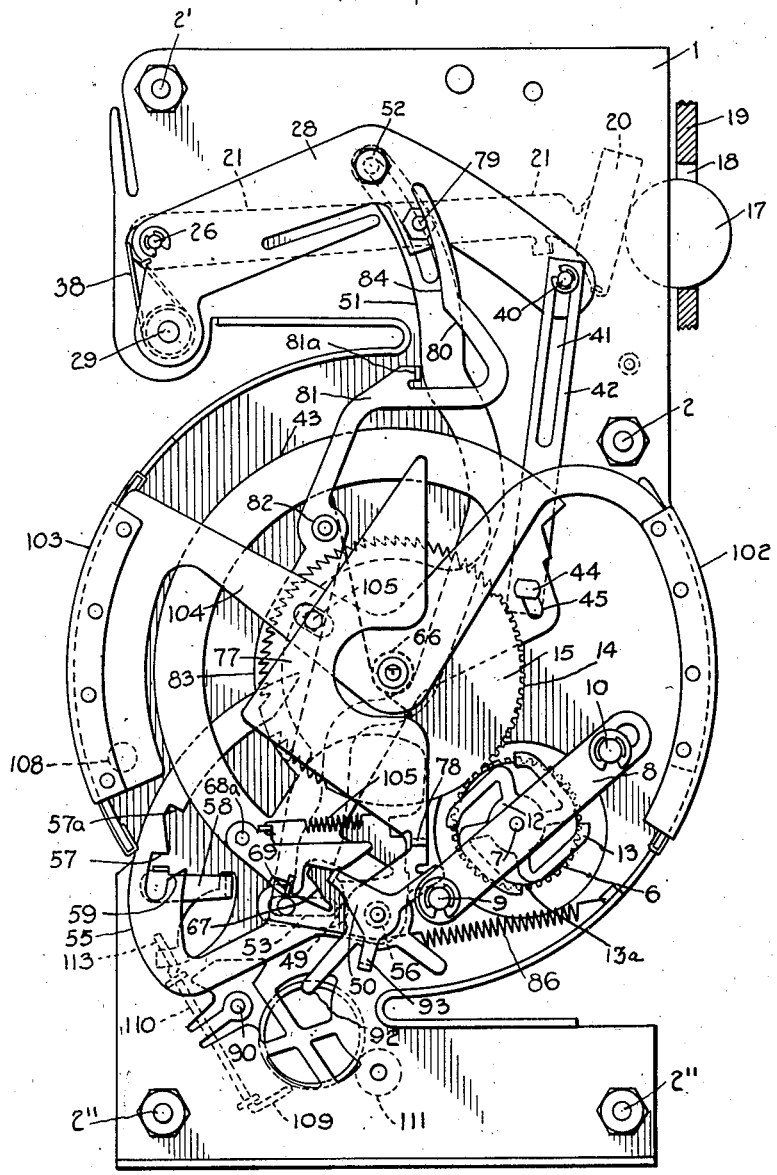
Fig. 1 is an elevation view of a parking meter mechanism embodying the invention as seen from one side thereof.

The parking meter mechanism as illustrated is of the automatic type wherein the deposit of a coin of appropriate value in the meter, sets the meter to indicate the parking time purchased without further manipulation by the parker. As shown in Fig. 17, the parking meter may be of the twin meter type; i. e., a meter in which two meter mechanisms are enclosed in a single housing or case (not shown) so as to control two parking spaces from a single meter location. However, the present invention is not necessarily limited to use in these particular types of parking meters.

Each of the meter mechanisms is assembled on a chassis plate 1. The chassis plates 1 are secured in spaced relation to each other by tie bolts 2, 2' and 2" with a clock or timer 3 being located between them for controlling the time-indicating operation of both of the meter mechanisms. The bottom ends of the chassis plates are supported on a base (not shown) and the plates extend vertically therefrom.

The clock 3 is mounted on a clock plate 4 which has a slotted opening therein through which the tie bolt 2 passes. A clock output shaft 5 extends beyond the clock case on both sides thereof and a gear 6 is rotatably carried at each end of the shaft 5. The clock output shaft has trunnions 7 at each end thereof which are journalled in bridge plates 8 carried by the chassis plates and the clock is prevented from rotating by engagement with the clock plate with the tie bolt 2. The bridge plates 8 are supported in appropriate positions on the respective chassis plates by studs 9 and an eccentric stud 10 which permits adjustment of the clock shaft and gear.

The chassis plates 1 are constructed and the bridge plates 8 are located thereon in such a way that the gears 6 on the clock output shaft are located on the same sides of the respective chassis plates. This permits the meter mechanisms which are assembled on the two chassis plates to be identical and the details of this construction of the meter are more fully described and claimed in copending application Serial No. 377,790 entitled "Twin Parking Meter" filed concurrently herewith now Patent No. 2,749,978 to which reference may be made in this connection. Inasmuch as the meter mechanisms which are assembled on the respective chassis plates are identical, it will suffice to describe one of the meter mechanisms here.

Referring to Fig. 17, the gear 6 is rotatably mounted on a clock output shaft bushing 5a which is rotatably mounted on and urged axially of the clock shaft by a spring 11 into engagement with a spider 12 of a slip clutch. As shown in Fig. 1, the clutch spider 12 which is frictionally driven by the clock shaft, has four arms 13 and the ends of the clutch arms bear against teeth 13a on the face of the gear 6. The arms of the clutch and the teeth on the face of the gear are arranged so as to permit the gear 6 to be rotated freely on bushing 5a in a counter-clockwise direction (as seen in Fig. 1), but to prevent rotation of the gear in the opposite direction. The gear 6 on the clock shaft meshes with gear teeth 14 which are located on a segment of the periphery of a ratchet wheel 15. The ratchet wheel 15 is rotatably supported on a bushing 16 secured to the chassis plate and rotation of the ratchet wheel in a clockwise direction (in the setting of the meter for a time-indicating operation as will be described hereinafter) is permitted by the slip clutch with movement of the ratchet wheel in a counter-clockwise direction being restricted by the clutch to the rate at which the gear on the clock shaft is permitted to rotate in a clockwise direction by the clock or timer 3. For the purposes of repair or adjustment the clutch spider, which is frictionally driven by the clock shaft, may be forced to rotate in a clockwise direction on the clock shaft, but this is not normal.

The meter mechanism is first cocked by the insertion of a coin (or other article) by the parker. It should be noted, that while the insertion of the coin conditions or cocks the meter mechanism for operation, the meter mechanism will not indicate the time purchased until a coin of appropriate value has been deposited in the meter; i. e. when the coin has been released by the parker, and the cocking of the meter is the same regardless of the value or the size of the coin inserted. The cocking of the meter will now be described.

Referring to Figs. 1 and 5, which illustrate the face and rear of the meter mechanism, respectively, a coin 17 upon being inserted through a coin slot 18 in a suitable housing or case 19 contacts with the forward face of a coin door 20 which is pivotally mounted on the forward end of a strut 21 by means of a pin 22 positioned above the center line of the coin slot. The pin 22 extends through the strut and through slotted openings 23 in the sides of the door. A spring 24 resiliently urges the door into engagement with the case so as to close the coin slot and the limited movement of the door on the strut which is permitted by the slots 23 compensates for slight variations that may exist in respect to the location of the meter mechanism relative to the case.

The coin door 20 and the forward end of the strut project through a coin-receiving passageway which is formed by the chassis plate and a guide plate 25 (see Fig. 7) and communicates with the coin slot in the case. The guide plate 25 is removably secured to the chassis plate so that the coin-receiving passageway can be readily cleared of any obstruction therein.

The strut 21 extends across the rear face of the chassis plate and is pivotally mounted on a pin 26 which extends through an arcuate slot 27 in the chassis and is secured to an actuator 28. The actuator 28 is located on the front face of the chassis plate and is pivoted on a pin 29 at the rear edge thereof. The actuator has an arm which extends toward the front edge of the chassis plate which is raised and lowered as the actuator is rocked about its pivot.

When the coin door and strut are in their forward position, as shown in Fig. 4, the strut is held against rotation relative to the actuator by a latch mechanism consisting of a latch member 30 which is pivotally mounted on a pin 31 carried by the chassis. The latch member 30 has an opening 32 therein through which a roller 33 carried by the strut extends for engagement with a latching surface 34 defined by the opening. A spring 35 urges the latch in a direction to engage the latching surface with the roller on the strut and a tension spring 36 connected between the chassis plate and the roller on the strut urges the strut to its forward position.

The insertion of a coin through the coin slot swings the coin door about its pivot point, as indicated in Fig. 5, and forces the strut rearwardly. The rearward movement of the strut, which is guided by the latch and the actuator, causes the actuator to be rocked in a counter-clockwise direction (as seen in Fig. 1) about its pivot pin 29 which raises the forward end of the actuator. As the strut approaches the rearward limit of its travel, the latch 30 comes into contact with an adjustable eccentric or stop 37 on the chassis plate which prevents further rearward movement of the latch with the strut. The continued rearward movement of the strut under the influence of the coin causes the roller 33 to move out of engagement with latching surface 34 on the latch and when roller 33 clears the latching surface, the roller is free to move upwardly in the opening 32 in the latch.

When the roller is released from the latch, the actuator 28 and the strut are then free to rotate relative to each other and the actuator is swung in a clockwise direction (as seen in Fig. 1) about its pivot pin 29 by the action of an actuator spring 38 which returns the actuator and the pin 26 carried by the actuator to their initial position. This moves the rear end of the strut forward while the forward end of the strut swings upwardly under the influence of the inserted coin. The upward movement of the strut carries the forward end of the strut and the coin door above the coin and they then move forwardly over the top of the coin as shown in Fig. 6. As the coin door moves upwardly with the strut, the spring 24 tends to swing the coin door about its pivot on the strut and over the top of the coin.

In normal operation of the meter the coin is then released by the parker and the strut and coin door are returned to their initial position by the strut spring 36. The downward movement of the strut and coin door under the influence of the spring 36 projects the coin through the coin-receiving passageway and into the entrance of a coin chute 39. Upon return of the strut to its forward position, the latching surface 34 on the latch 30 is reengaged with the roller 33 on the strut by the spring 35. It should be noted that if the coin strut is prevented or obstructed for any reason from returning to its initial position, it will not affect the subsequent operation of the meter so long as a coin is deposited in the meter and the actuator returns to normal position.

Figure 2:
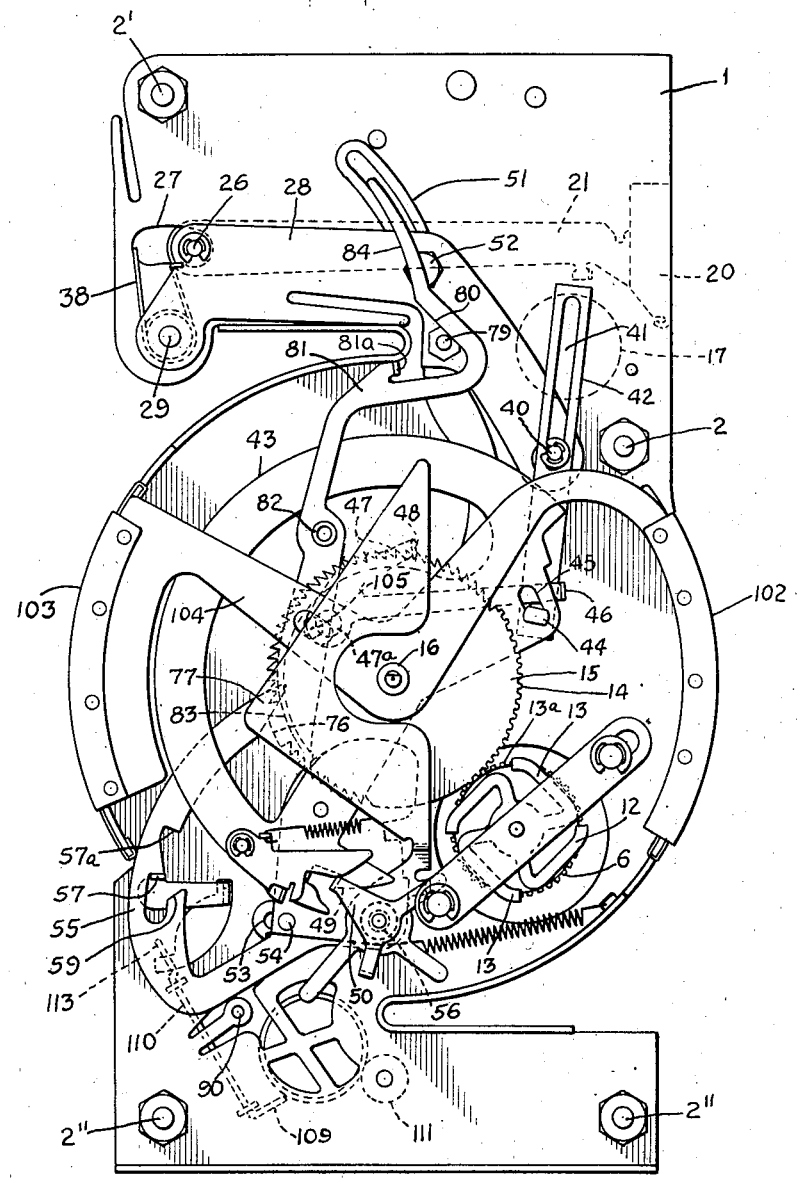

The cocking action caused by inserting a coin will now be described. Referring particularly to Figs. 1, 2 and 3, a carrier link eccentric 40 is carried on the forward end of the actuator 28 and extends through a slot 41 in a carrier link 42. The carrier link 42 is connected to a rotatable carrier 43 by a pin 44 which extends through a slot 45 in the carrier. The carrier 43 is mounted on the bushing 16 which supports the ratchet wheel 15 and the carrier is rotatable thereon about the ratchet wheel.

The pin 44 on the carrier link extends into engagement with a finger 46 of an arresting pawl 47 (see Fig. 2) which is pivoted on a pin 47a, shown in dotted lines in Figs. 2 and 3, carried by the carrier. The pin 47a is located on the carrier inside of the periphery of the ratchet wheel 15 and the pawl 47 normally is in engagement with the ratchet wheel. Thus, when the forward end of the actuator is raised, the initial movement of the pin 44 in response thereto lifts the finger of the arresting pawl which disengages a latching surface 48 on the arresting pawl from the ratchet wheel 15. The arresting pawl 47, in view of the location of the pin 47a with respect to the ratchet wheel as above described, is arranged to normally prevent counter-clockwise movement of the carrier relative to the ratchet wheel and to permit counter-clockwise movement of the wheel relative to the carrier (as seen in Fig. 1), and when the arresting pawl has been disengaged from the ratchet wheel and the pin 44 reaches the end of the slot in the carrier, the continued upward movement of the forward end of the actuator rotates the carrier in a counter-clockwise direction (as seen in Fig. 1) about the ratchet wheel.

When the forward end of the actuator reaches the limit of its upward movement, the carrier is rotated to an "over travel" position, as shown in Fig. 1, and a latching surface 49 at the lower end of the carrier is in position to be engaged by a carrier latch 50 which is pivotally mounted on the chassis plate and is spring biased in a clockwise direction. The carrier is urged by a spring (not shown) to rotate in a clockwise direction about the ratchet wheel and the engagement of the latch 50 with the carrier holds the carrier in a cocked position, as shown in Fig. 2.

The actuator is also connected to a hammer link 51 by a hammer link eccentric 52 which extends through a slotted opening in the hammer link so that when the forward end of the actuator is raised, the hammer link is also raised. The lower end of the hammer link contains a slot 53 through which a pin 54 carried on the face of a hammer 55 extends. The hammer 55 is rotatably mounted on a bushing 56 (see Fig. 10a) which is secured to the chassis and as the hammer link is raised, the hammer is rotated in a clockwise direction (opposite to the carrier). When the hammer reaches it "over travel" position, as shown in Fig. 1, a latching surface 57 on the hammer is in position to be engaged by a trigger 58 which is pivotally mounted on the chassis plate and is spring biased in a counter-clockwise direction. The hammer 55 is provided with a guide 59 which engages with the trigger to insure that the trigger will move into position for engagement with the latching surface 57 when the hammer is moved quickly.

As the hammer is rotated to its "over travel" position, a cam surface 60 on the hammer (see Fig. 12) engages with a tongue 61 of a coin pawl 62. As shown in Figs. 4, 8 and 9, the coin pawl is pivoted on a pin 62a extending from the rear of the chassis plate and the tongue 61 extends through an arcuate slot 63 in the chassis plate. The coin pawl has a second tongue 61a which extends through an arcuate slot 64a in a coin shroud 64. The coin pawl is normally held in the position shown in Fig. 8 by a spring 65 and in this position the tongue 61a forms a part of a pocket into which the coin passes as it is discharged from the lower end or outlet of the coin chute 39.

When the strut roller 33 is released by the coin door latch, the slots in the carrier link and the hammer link permit the actuator to be swung downwardly by the actuator spring to the "rest" position, as shown in Fig. 3. When the actuator is returned to its "rest" position, the carrier is urged by a spring 66 which surrounds the bushing 16 to rotate in a clockwise direction about the ratchet wheel, but is prevented from doing so by latch 50. As the carrier approaches "over travel" position (as shown in Fig. 1), a camming surface 67 on the carrier engages with the carrier latch and lifts the carrier latch into position to engage with the latching surface 49 on the carrier. When this occurs, the carrier latch 50 is also forced against a projection on a driving pawl latch 68 which is pivotally mounted on a pin 68a on the carrier and swings the driving pawl latch 68 in a counter-clockwise direction to release the latch from engagement with a tab 69 on a driving pawl 70.

Figure 12:
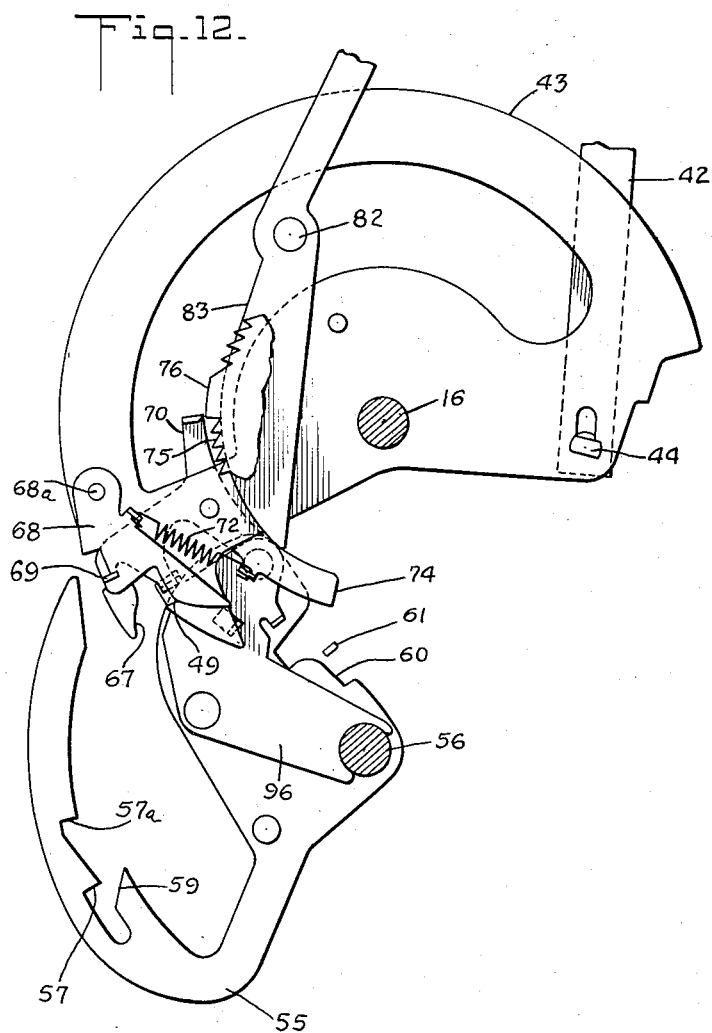

As shown best in Figs. 10–12, the driving pawl is pivoted on a pin 71 extending from the rear face of the carrier and is urged by a spring 72 which is secured to a projection on the driving pawl latch toward engagement with the ratchet wheel 15 when the latch 68 is released. The driving pawl is prevented from immediately engaging with the ratchet wheel by a driving pawl rest 73 the position of which may be adjusted by means of an eccentric 73a (Fig. 4), and which engages with a tail 74 of the driving pawl and holds the driving pawl in a position where the pawl clears the short or normal teeth 75 on the ratchet wheel. As will be described later, the ratchet wheel has a long tooth 76 which may be engaged by the driving pawl in this position. The above eccentric adjustment determines the point at which the tail of the driving pawl drops off the pawl rest 73 on movement of the carrier from cocked position toward rest position, and thus determines the point in the travel of the carrier from cocked position at which it is connected by the pawl to the short teeth of the ratchet wheel.

As the hammer 55 is raised in the meter cocking operation, the hammer engages with a finger 78 on a bobweight 77 which is also rotatably mounted on the bushing 56. The bobweight is rotated by the hammer to a substantially vertical position, i. e., with the center of gravity of the bobweight slightly off vertical (as shown in Fig. 1), and is supported in this position as long as the hammer remains cocked.

An adjustable pin or ecentric 79 is carried on the actuator 28 and engages with a camming surface 80 on a throwout cam 81 when the forward end of the actuator is raised. The throw-out cam 81, which, for purposes to be described hereinafter, is provided with an indicator engaging tab 81a, is pivoted on a pin 82 which is supported on the chassis plate and extends through an opening in the carrier. The action of pin 79 on the camming surface 80 as the actuator is raised swings the throw-out cam about its pivot 82 and moves the tail 83 of the throw-out cam which engages with the driving pawl to a position concentric with and at a radius greater than the teeth of the ratchet wheel. The throw-out cam is held in this position during further upward movement of the actuator by a dwell surface 84 on the throw-out cam.

The foregoing completes the cocking of the meter mechanism and the meter is now set so that it may be placed in time-indicating operation. When the meter mechanism has been cocked with the various parts being in the position shown in Fig. 2, the coin is released and falls into the coin chute. The coin then automatically sets the meter mechanism into time-indicating operation with the amount of parking time purchased corresponding to the value of the coin deposited. It should be noted that in order to set the meter into time-indicating operation, the coin must be released and permitted to fall through the coin chute.

The released coin falls freely through the coin chute 39 and is discharged from the lower end thereof into a coin measuring apparatus. As shown in Fig. 4, the coin upon leaving the coin chute, strikes a tang 84 of the trigger 58 which extends into the path of the coin. The trigger is pivoted on a pin 85 and is normally held in position to engage with the hammer by a coil spring 85a which is anchored on the pin 85 and has one end connected to the tang 84. The engagement of the coin with the trigger, causes the trigger to be swung downwardly (in a counter-clockwise direction, as seen in Fig. 4), about the pin 85 and releases the trigger from engagement with the latching surface 55 of the hammer 55. The hammer is then swung downwardly, from the position shown in Fig. 2 to the position shown in Fig. 3, under the influence of a hammer spring 86.

If the coin is inserted by the parker in such a manner that the hammer is not fully cocked, the trigger will engage a second latching surface 57a on the hammer and prevent return of the hammer to "rest" position if the coin is then withdrawn from the coin slot by the parker. Under such condition the hammer holds the bob weight out of engagement with the carrier latch. Otherwise it is possible to insert a coin in such a manner as to (due to inertia forces) cock the carrier and release the driving pawl latch without fully cocking the hammer, whereupon on withdrawal of the coin from the slot the hammer and bob weight are permitted to return to normal position and unlatch the carrier, thus advancing the indicator to give the parker free time.

The hammer carries a hammer pin 87, which strikes the edge of the coin when the hammer falls. The engagement of the hammer pin with the coin forces the coin against a stop 88 on the coin shroud 64 with the tang 84 of the trigger extending into an opening 89 in the coin shroud. In this position the coin rests on a basing pin 90 carried by the coin shroud and is held in place by the stop 88 and the hammer pin 87.

The hammer in falling also releases the coin pawl 62 and permits the coin pawl to be swung about its pivot pin 62a by the spring 65 until the tongue 61a thereof engages with the coin. This insures that the coin will be seated against the stop 88 and on the basing pin 90 when the hammer pin engages with the coin.

The downward movement of the hammer under the influence of the hammer spring ceases when the hammer pin 87 comes into contact with the edge of the coin. The basing pin 90, the stop surface 88 and the hammer pin 87 are so positioned that the hammer will stop at different positions for coins of different diameters.

As the hammer starts on its downward path, its support of the bobweight, which until now has been poised in a substantially vertical position, is removed and the bobweight is permitted to fall under its own weight. Due to its inertia and the fact that it is nearly at top dead center, the bobweight lags somewhat behind the spring urged movement of the hammer and permits the coin to be properly seated in position for measurement by the hammer before the bobweight reaches the end of its movement. As the bobweight reaches the end of its downward movement, a finger 92 carried thereon strikes a tang 93 on the carrier latch 50, and swings the carrier latch out of engagement with latching surface 49 on the carrier to release the carrier for clockwise movement, this occurring after the hammer has come to rest in a position determined by the measured coin.

As previously mentioned, when the carrier is cocked, as shown in Fig. 11, the driving pawl is unlatched and is urged by the spring 72 to engage with the teeth of the ratchet wheel 15 but is held from engagement therewith by the engagement of the tail 74 of the driving pawl with the driving pawl rest 73. However, when the carrier 43 is released by the carrier latch 50, the carrier rotates in a clockwise direction and the driving pawl tail 74 leaves the rest 73 permitting the ratchet engaging surface of the driving pawl to be engaged with the ratchet wheel by the driving pawl spring 72. The ratchet wheel is then locked against movement in either direction relative to the carrier by the driving pawl and by the arresting pawl 47 which is pivotally mounted on the carrier. The arcuate travel of the carrier from the point at which the driving pawl drops off the rest and engages the ratchet wheel rotates the ratchet wheel in a clockwise direction with the gear 6 on the clock output shaft being rotated in a counter-clockwise direction as is permitted by the spider 12 of the slip clutch.

As shown best in Figs. 13, 14, 15, and 16, the hammer carries a stop plate 96 which is rotated with the hammer about the bushing 56. The stop plate has a series of upstanding tabs or stops, as indicated at 97, 98 and 99, projecting from the face thereof. The tabs or stops are located on the stop plate at varying radial distances from the center of the bushing 56 about which the stop plate rotates with the hammer and are so positioned angularly with respect to their center that the stop corresponding to the coin deposited lies in the arcuate path of travel of a finger 100 which projects from the rear of the driving pawl 70 as the driving pawl is rotated with the carrier and the ratchet wheel.

When the finger 100 on the driving pawl comes into engagement with one of the stops 97, 98 or 99, the driving pawl is rocked about its pivot on the carrier and is lifted out of engagement with the ratchet wheel as shown in Figs. 3 and 12. As the driving pawl reaches the limit of its rocking movement, the carrier and the ratchet wheel are brought to a stop. As the carrier comes to a stop, the arresting pawl 47 which has been permitted to reengage with the ratchet wheel by the return of the actuator to its downward position prevents over travel of the ratchet wheel due to inertia. As previously mentioned, the position of the hammer and thus, the stop plate is determined by the diameter of the coin deposited in the meter and the stops on the stop plate are located so as to permit an angular movement of the ratchet wheel in a clockwise direction under the influence of the carrier and driving pawl which is proportioned to the value of the coin deposited in the meter.

Figure 15:
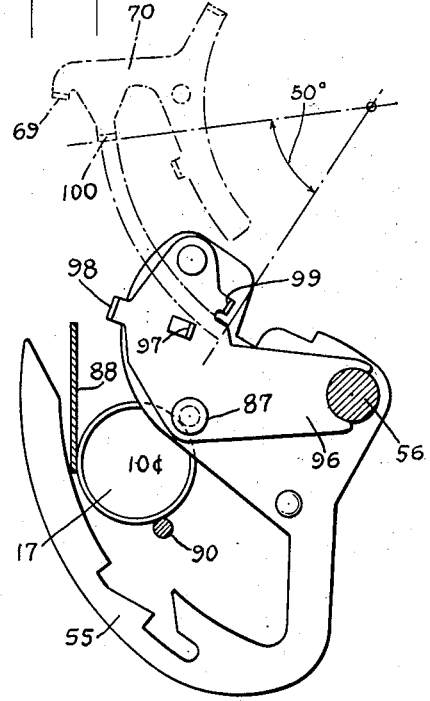

In the particular embodiment illustrated, the carrier and the ratchet wheel are designed to rotate approximately fifty degrees upon the deposit of a coin of value to purchase the full parking time and proportional parts of the full parking time may be purchased by depositing coins of lesser value. The stops on the stop plate illustrated in Figs. 13, 14, and 15, are arranged so that a dime will purchase the full parking time of sixty minutes; a nickel will purchase thirty minutes parking time; and a penny will purchase six minutes parking time.

If, after the meter is cocked, the coin is withdrawn and a small washer or the like is inserted in the meter having sufficient weight to operate the latch 53 and release the hammer but being of insufficient diameter to be measured by the hammer or to remain in the coin pocket, the finger 100 of the driving pawl will, on release of the carrier, engage stop 99, and while the indicator will be advanced slightly, this advance will not be sufficient to purchase any useful amount of parking time. If the flag is in the overtime range, the flag will not under these circumstances, due to the positioning of stop 99, be moved beyond the zero position, and such movement will only occur when the ratchet wheel and indicator are so positioned as to permit engagement of the driving pawl with the long tooth on the ratchet wheel.

Figure 13:
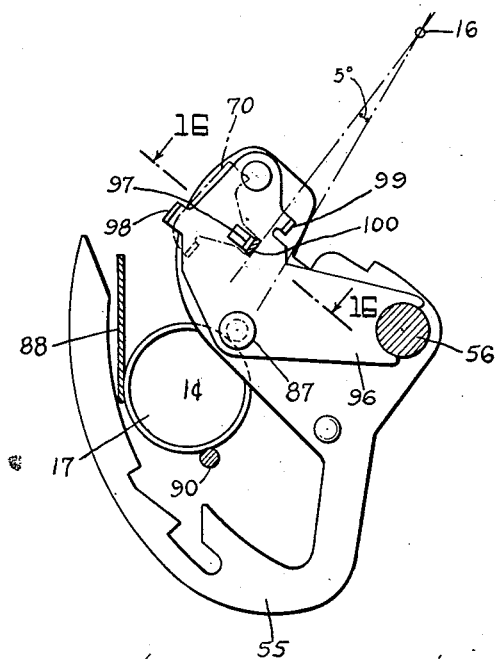
Figs. 13, 14 and 15 are face views showing portions of the meter mechanism illustrated in Fig. 12 in various operating positions thereof.

When a penny is deposited in the meter, as shown in Fig. 13, the finger 100 on the driving pawl engages with the stop 97 which limits the carrier and the ratchet wheel advances to an angle of five degrees from the no-coin position thereof.

Figure 14:
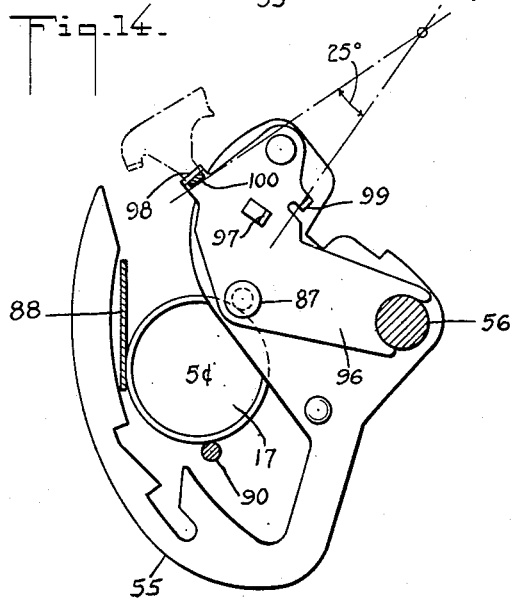
Figure 16:
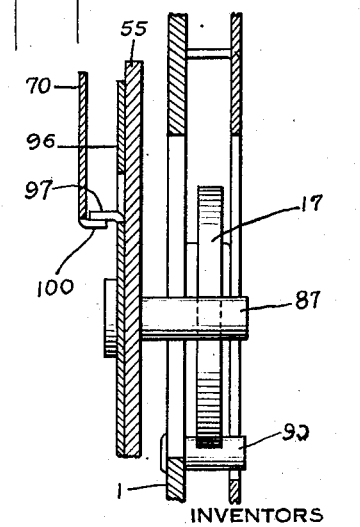
Fig. 16 is a section view taken along the line 16—16 of Fig. 13.

When a nickel is deposited, as shown in Fig. 14, the finger 100 engages with the stop 98 and limits the carrier and ratchet wheel advance to twenty-five degrees from the no-coin position. When a dime is deposited in the meter, as shown in Fig. 15, the carrier and ratchet wheel are permitted to advance the full distance or fifty degrees and it is not necessary to provide a stop on the stop plate to engage with the finger 100 on the driving pawl in this case, as at the full time position the indicator engages the tab 81a and operates the throw-out cam to disengage the driving pawl from the ratchet wheel and move it to latched position. However, if desired, a stop may be provided on the stop plate at this position.

It should be noted that when a second penny or nickel is deposited in the meter, the carrier and ratchet wheel will be advanced a distance proportionate to the value of such coin in addition to the time previously purchased or indicated by the meter.

From the foregoing, it will be understood that stops may be arranged on the stop plate so as to obtain the desired meter operation for the appropriate angular movement of the ratchet wheel for any number of coins or combinations thereof. This can be readily accomplished by merely changing the stop plate on the hammer and does not require any other changes in the meter mechanism as such. In this connection, a modified form of stop plate will be described hereinafter.

One feature of such an arrangement is that the stops on the stop plate may be located so as to obtain an advance of the carrier and ratchet wheel which is proportional to the value of coin deposited rather than to the diameter of the coin and hence, the meter is not limited to the use of coins that increase in diameter as the value of the coin increases. Also the stops on the hammer and driving pawl finger 100 may be so dimensioned as to engage only when the hammer measures coins coming within a given tolerance range as to diameter, and can be so arranged for each of the coins of different value which the meter is designed to accept. Additional no-coin stops such as 99 are then properly positioned on either side of stops 97 and 98, for example, in such a manner that on insertion of slugs or coins of slightly larger or smaller diameter than that of the coins which the meter is designed to accept for the purchase of parking time, the hammer will be positioned with one of the no-coin stops in the path of the pawl finger 100, and such improper coins will not purchase any parking time. Thus the stops can be so positioned and dimensioned as to permit the purhcase of parking time with a plurality of coins of different value provided the size of each coin is within a given tolerance range, and to prevent the purchase of parking time by any of these coins if their size is not within the tolerance range.

When the driving pawl and carrier have been stopped by the stop plate and the driving pawl has been rocked counterclockwise on the carrier to the position shown in Fig. 12, the driving pawl latch 68 which is pivotally mounted on the carrier, is urged by the spring 72 into engagement with the tab 69 on the driving pawl. The driving pawl latch then prevents reengagement of the ratchet wheel by the driving pawl in the event that the driving pawl is subsequently moved out of engagement with the stop plate as by cocking of the meter. Under these conditions, the driving pawl will remain latched in its released position until after the carrier is again cocked by subsequent coin insertion.

A visible indication of the parking time purchased or remaining on the meter (see Fig. 3) or an indication that the parking time has expired and a parking violation exists (see Figs. 1 and 2), is provided by signal flags 102 and 103 which are positioned behind windows (not shown) in the front and rear of the casing, respectively. The signal flags are mounted on a flag frame 104 which is rotatable about the same center as the ratchet wheel and rotation of the flag frame relative to the ratchet wheel is prevented by a bolt 105 carried by the ratchet wheel and having a hexagon shaped head which projects into an enlarged slot 105a in the flag frame. The head of the bolt is positioned to engage with the sides of the slot and the clearance between the head and the sides of the slot may be adjusted by turning the bolt to provide a loose or lost-motion connection between the flag and ratchet wheel. Since the flag is unbalanced and the arresting pawl is liable to be momentarily disengaged from the ratchet wheel when the meter is subjected to severe vibration as by pounding on the meter case or post, it is possible in response to such vibration and in the event this lost-motion connection is not used, to rotate the clock shaft gear 6 in a counterclockwise direction (as viewed in Fig. 1) sufficiently to cause one of the clutch fingers 13 to pick up another tooth, the fingers of course preventing subsequent return of wheel 6 to its original position. If the pounding is continued, the flag may be advanced to gain free time. The amplitude of vibration of the flag under the above condition is very small however, and the lost motion permits the indicator to be moved slightly toward time-purchased position and then fall back again, without however moving the ratchet wheel in time-purchased direction. The signal flags are thus rotated an angular distance corresponding to the angular advance of the ratchet wheel which is determined by the value of the coin deposited.

As shown in Figs. 18 and 19, the rotation of the flags in this manner raises the rear flag 103 and exposes a scale plate 106 which is mounted on the chassis behind the flag and is visible through the window in the rear of the housing while the front flag 102 is lowered and exposes a scale 107 which is visible through the window in the front of the housing. The scales 106 and 107 have appropriate time-indicating markings or scales thereon with which the leading edge of the signal flags cooperate to indicate the parking time for which the meter is set. When the flags are in a violation (or a grace) position, the scales are covered by the flags and such a condition can be readily observed from either the front or rear of the meter. The scale plates 106 and 107 may be removably supported on the chassis plate so that appropriate scales may be substituted as desired.

The flags and flag arms are unbalanced by a weight 108 which is secured to the flag frame adjacent the lower end of the rear flag 103. The weight 108 tends to rotate the flags in a counterclockwise direction (as seen in Fig. 1) or toward their violation indicating positions. The rotation of the ratchet wheel and the flags in this direction is permitted to take place at a timed rate by the engagement of the ratchet wheel with the clock gear 6, the weight of the flag tending to drive the timer.

For reasons such as the provision of the grace period, the flags may be positioned beyond the zero points on the scales when indicating overtime parking and the purchased time will only be indicated by arcuate travel of the flags from the zero position on the scales. To insure obtaining such movement, the long tooth 76 is provided on the ratchet wheel.

As previously described, the driving pawl is restrained by the driving pawl rest 73 and is held radially clear of the normal teeth 75 of the ratchet wheel when the carrier is cocked but the pawl is in a position to engage the long tooth 76 of the ratchet wheel at this time. Thus, if the flag is at any position beyond zero (i. e., in the overtime indicating range), the driving pawl during its preliminary movement and while the driving pawl tail is still on the rest, will engage with the long tooth of the ratchet and move it and the flag to the zero position. At this point the driving pawl tail drops off the rest and further rotation of the ratchet wheel and the flags is determined by engagement of the driving pawl with the appropriate stop on the stop plate as described above.

In servicing of the meter, the flags may be reset manually to the violation position by forcing the gear 6 on the clock shaft and the clutch to rotate in a clockwise direction relative to the clock output shaft against the friction established by the spring 11. However, in normal operation the flags which are weighted to return to the violation position, are restrained so as to move only at a speed dependent upon the clock output shaft speed.

As the hammer is raised toward its cocked position by insertion of a coin as described above, the coin pawl 62 is cammed upward in a clockwise direction by the hammer as previously mentioned, allowing a previously inserted coin supported in the pocket to roll forward off the basing pin 90. The previously inserted coin then drops to a position where it rests on an offset end 109 of a rod 110 and a shroud support 111 which form a last coin holdout and the coin cannot be released from this position until another coin is deposited in the meter. The rod 110 is rotatably mounted on the coin shroud and the offset end 109 thereof is normally held in contact with the chassis plate and coin-engaging position by a spring 112. When the coin is held in this position, it may be seen through a coin viewing window (not shown) provided in the meter housing. This serves to discourage the use of slugs.

When a subsequent coin is fully inserted in the meter and falls through the coin chute so as to operate the meter as described above, the trigger 58 in moving downward strikes a crank 113 on the rod 110 and rotates the rod so that the offset or coin retaining finger 109 is swung clear of the coin and the previous coin is allowed to drop into a coin box (not shown) located below the meter mechanism.

In Figs. 20 through 24 a modified form of stop plate 120 is illustrated which is designed to operate on a different sequence of coins. These figures show the stop plate in the various positions thereof corresponding, respectively, to a penny, a nickel, a dime, a quarter and no coin. In these figures parts similar to those previously described have been identified by corresponding reference characters and need not be described again.

The stop plate 120 has five upstanding tabs or stops 121, 122, 123, 124 and 125 on the face thereof. As previously described, the stops on the stop plate are spaced from each other and are located at different radial distances from the center 56 about which the stop plate rotates. The stops are so arranged on the stop plate that an angular movement of the driving pawl 70 and the ratchet wheel about the center 56 proportional to the value of the coin deposited in the meter is obtained when the hammer pin 87 rests on the peripheral edge of the coin and thus, positions the hammer and stop plate accordingly.

When a penny is deposited in the meter, the driving pawl finger engages with the stop 121 as shown in Fig. 20. If a nickel is deposited, the finger engages with the stop 122, as shown in Fig. 21. If a dime is deposited, the finger engages with the stop 123, as shown in Fig. 22, and if a quarter is deposited, the finger engages with the stop 124 as shown in Fig. 23. In the event that the hammer is tripped with no coin in the coin pocket, the finger engages with the no-coin stop 125 as shown in Fig. 24.

It will be noted that, as shown in Fig. 23, the quarter does not provide for a full scale advance of the ratchet wheel and the signal flags and hence, the stop 124 is required in this case. The deposit of two quarters or any combination of coins totaling fifty cents would provide a full scale advance of the ratchet wheel and signal flags from their zero or violation indicating position.

It is well known that many people attempt to obtain free time by improper operation of a parking meter, and in addition to the means already described for preventing such operation, the throw-out cam 81, which prevents engagement of the driving pawl with the ratchet wheel during insertion of a coin, also performs an important function. It was found that without provision for operating the throw-out cam in this manner, two coins could be inserted in rapid succession in such a manner as to obtain parking time in excess of the value of the two coins. The first coin cocked and released the hammer and carrier in the normal manner, and the second coin moved the hammer out of the first coin measuring position prior to completion of the indicator advancing movement of the carrier resulting from the insertion of the first coin, the result being that the stop corresponding to the first coin was moved out of its proper driving pawl engaging position, and the driving pawl engaged a stop for a coin of higher value or went between the stops. In the event pennies were used, for example, it was possible in some instances to obtain the full parking time by the insertion of two pennies. The throw-out cam operated by the actuator prevents such improper operation, as the insertion of the second coin immediately operates the throw-out cam to disengage the driving pawl from the ratchet wheel and prevents further advance of the indicator by the carrier.

From the foregoing description, it will be understood that on insertion of a coin in the coin slot of the meter, with the meter parts in normal position, the following sequence of events will occur. As the coin is inserted, the coin door, being pivotally mounted on the strut above the center line of the coin slot, will rotate in a counter-clockwise direction about pin 22 (as viewed in Fig. 5) until stopped by the strut 21, and consequently the coin will exert an upward force on the strut, upward movement thereof being prevented however by engagement of the roller 33 with notch 34 of latch 30. Thus movement of the strut is guided by its connection to the actuator and by the engagement of roller 33 with the latch until the roller disengages the notch 34, this occurring on further movement of the strut following engagement of the latch with the eccentric pin 37. After the roller disengages, the strut is cammed upward by the coin, and the actuator spring 38 returns the actuator to its original position. During this movement the coin door assumes a position above the top of the coin against the meter housing, and under the action of spring 36 tends to project the coin into the coin chute, an action which occurs as soon as the parker has released the coin. It should be noted, however, that the actuator is permitted to return to its original position regardless of whether the coin is released or not, and that consequently, blocking of the coin slot by an object other than the coin will not prevent the return of the actuator to normal position.

Movement of the actuator by insertion of the coin moves the hammer and carrier to their cocked positions substantially simultaneously, the initial movement of the actuator serving, through the connections already described, to move the arresting pawl out of engagement with the ratchet wheel to prevent retrograde movement of the indicator with the carrier, and to move the driving pawl hold-out cam to a position which prevents the possibility of engagement of the driving pawl with the ratchet wheel until the actuator returns to normal position.

As the hammer moves toward cocked position, it moves the coin pawl away from its normal position sufficiently to permit the previously deposited coin to roll into the last coin hold-out position, and engages the bob weight to move it to the upright position shown in Fig. 1. As the hammer reaches the end of its movement, it is engaged and held in cocked position by the trigger 58, and also holds the bob weight in upright position.

At about the same time the carrier is moved to cocked position, where it is engaged and held by the carrier latch 50, which also contacts and disengages the driving pawl latch 68 from the driving pawl. This releases the driving pawl which is spring biased toward engagement with the teeth of the ratchet wheel, and causes the tail of the driving pawl to engage the driving pawl rest with the pawl tooth positioned to clear the short ratchet teeth.

The hammer and carrier are now in their cocked positions, and no further action takes place until the inserted coin falls through the coin chute into the pocket to hit the trigger 58 and release the hammer, as well as to operate the last coin hold-out rod 110 to release the previously inserted coin from the last coin hold-out position. The hammer, which is moved from cocked position by a spring, moves to coin measuring position, and during this movement, allows the coin pawl 62 to be returned by spring 65 toward the position shown in Fig. 8, where the coin pawl tongue 61a forms part of a pocket to receive the falling coin, the other two portions of the pocket being the stationary basing pin 90 and the fixed stop 88, and the coin being resiliently urged against the latter by the tongue 61a of the coin pawl. The hammer, which is moved very rapidly by its biasing spring, moves away from the bob weight, and the hammer pin 87 engages and forces the coin firmly into the pocket and comes to rest with one of the several stops on the stop plate positioned in the path of the finger 100 projecting from the rear end of the driving pawl on subsequent release of the carrier from cocked position. The bob weight, which was positioned nearly at top dead center by the cocking movement of the hammer, starts falling slowly under the influence of gravity, and consequently lags behind the spring operated hammer, the result being that the finger 92 of the bob weight does not strike tang 93 on the carrier latch 50 and thus release the carrier from cocked position until the hammer has come to rest with the hammer pin 87 resting against the inserted coin.

On release of the carrier, the driving pawl drops off the pawl rest and engages the ratchet wheel, and the carrier, ratchet wheel, indicator, and the gear 6 which free-wheels in this direction, move together until the finger 100 on the rear end of the driving pawl engages the appropriate stop on the hammer stop plate which has been positioned in the path of the finger by the engagement of the hammer pin 87 with the coin. When the finger 100 engages the stop, the driving pawl is disengaged from the ratchet wheel and latched, and further movement of the carrier, ratchet wheel and pawl is prevented, over travel of the ratchet wheel due to inertia being prevented by the arresting pawl. The indicator has now been advanced from violation position by an amount corresponding to the value of the inserted coin, and since it is biased toward violation position as heretofore described, it moves in that direction at a timed rate under the control of the timer. Although the hammer and carrier may again be cocked immediately by the insertion of an additional coin, the positioning of the indicator cannot be affected by such a coin until it is released by the parker and falls through the coin chute to engage the trigger 58 and release the hammer, whereupon the sequence of events above described is repeated. In the event the flag is already in a purchased-time position, the time purchased by an additional coin is added on to that already indicated by the flag.

It will be understood that a number of the operations which have been described take place simultaneously or practically simultaneously as the meter is cocked and set into time-indicating operation. It will also be understood that various modifications may be made in the embodiment of the invention illustrated and described herein without departing from the scope of the following claims.

We claim:

1. In a parking meter, the improvement comprising a movable indicator; means for advancing the indicator to a position indicating the purchase of parking time, said means including a rotatable ratchet wheel connected to the indicator, a carrier rotatable about the ratchet wheel and a driving pawl pivotally mounted on the carrier for engagement with the ratchet wheel, said driving pawl engaging with and moving the ratchet wheel upon movement of the carrier in one direction; a movable member for measuring the diameter of a coin deposited in the meter; and a plurality of stops carried by said movable member and engaging with the driving pawl at different positions in the movement of the carrier in said one direction; said stops being arranged so as to engage with and release the driving pawl from engagement with the ratchet wheel at points in the movement thereof in said one direction where the indicator indicates a purchase of time corresponding to the value of the coin measured by the movable member.

2. In a parking meter, the improvement as defined in claim 1 wherein the stops carried by the movable member are formed on a plate and the plate is removably secured to the movable member.

3. In a parking meter, the improvement as defined in claim 1 wherein the carrier is spring-biased to rotate in a direction for movement of the ratchet wheel in said one direction and which includes coin-actuated means for moving the carrier in an opposite direction.

4. In a parking meter, the improvement comprising a movable indicator; means for advancing the indicator to a plurality of positions indicating the purchase of parking time, said means including a rotatable ratchet wheel connected to the indicator, a carrier rotatable about the ratchet wheel and a driving pawl pivotally mounted on the carrier for engagement with the ratchet wheel, said driving pawl engaging with and moving the ratchet wheel upon movement of the carrier in one direction; a movable member for measuring the diameter of a coin deposited in the meter; a plurality of stops carried by the movable member for engaging with the driving pawl and interrupting the movement of the carrier at different points in the movement thereof in said one direction, said stops being arranged to engage with and to release the driving pawl from engagement with ratchet wheel at points in the movement thereof in said one direction where the indicator indicates a purchase of time corresponding to the value of the coin measured by said movable member; timing means for controlling the movement of the ratchet wheel and indicator at a timed rate in a direction opposite to said one direction; and a slip clutch connecting the ratchet wheel to said timing means and permitting movement of the ratchet wheel in said one direction independently of the timer.

5. In a parking meter, the improvement as defined in claim 4 wherein the carrier is spring-biased to rotate in a direction for movement of the ratchet wheel in said one direction and which includes means operable by insertion of a hand-held coin for moving the carrier in an opposite direction.

6. In a parking meter, the improvement comprising a movable indicator; means for moving said indicator to a position indicating the purchase of parking time, said means including a rotatable ratchet wheel connected to the indicator, a carrier rotatable about the ratchet wheel and a driving pawl pivotally mounted on the carrier, said driving pawl being spring-biased to engage with the ratchet wheel for movement of the ratchet wheel with the carrier upon movement of the carrier in one direction; coin-receiving means within the meter for supporting a coin deposited in the meter in a fixed position; a movable hammer for engaging with the coin at said fixed position; and stop means carried by the movable hammer for stopping the movement of the carrier and the ratchet wheel in said one direction at a point where the movement of the indicator therewith corresponds in time purchased to the value of the coin deposited in the meter, said stop means engaging with and moving the driving pawl out of engagement with the ratchet wheel at said point.

7. In a parking meter, the improvement comprising a movable indicator; means for moving said indicator to a position indicating the purchase of parking time, said means including a rotatable ratchet wheel connected to the indicator, a carrier rotatable about the ratchet wheel and a driving pawl pivotally mounted on the carrier, said driving pawl being spring-biased to engage with the ratchet wheel for movement of the ratchet wheel with the carrier upon movement of the carrier in one direction; coin-receiving means within the meter for supporting a coin deposited in the meter in a fixed position; a movable hammer for engaging with the coin at said fixed position; stop means carried by the movable hammer for stopping the movement of the carrier and the ratchet wheel in said one direction at a point where the movement of the indicator therewith corresponds in time purchased to the value of the coin deposited in the meter, said stop means engaging with and moving the driving pawl out of engagement with the ratchet wheel at said point; timing means for controlling the movement of the ratchet wheel and the indicator in an opposite direction at a timed rate and a slip clutch connecting the ratchet wheel to the timing means, said slip clutch permitting the movement to the ratchet wheel in said one direction under the influence of the driving pawl independently of the timer.

8. In a parking meter, the improvement comprising indicating means, said indicating means including a movable signal flag, said signal flag being biased toward a violation indicating position thereof and being movable to a plurality of purchased-time indicating positions; means for advancing the signal flag to different purchased-time indicating positions thereof, said means including a rotatable ratchet wheel, said ratchet wheel connected to the signal flag, said ratchet wheel advancing the signal flag on movement thereof in one direction, a driving pawl rotatable about the ratchet wheel, said driving pawl being engageable with the ratchet wheel for moving the ratchet wheel in said one direction; means for determining the value of a coin deposited in the meter; and movable stop means associated with said value-determining means for engaging with and releasing the driving pawl from engagement with the ratchet wheel upon movement thereof in said one direction to a point where the signal flag has been moved a distance corresponding in time to the value of the coin deposited in the meter.

9. In a parking meter, the improvement as defined in claim 8 wherein said stopping means includes a plurality of stops, each of said stops being positioned to engage with the driving pawl at a different point in the movement thereof in said one direction, each of said points permitting an advance of the signal flag to indicate a purchase of time corresponding to the value of the coin deposited in the meter.

10. In a parking meter, the improvement as defined in claim 8 wherein the movable stop means includes a plate having stops formed thereon, said plate being removably secured to the value-determining means.

11. In a parking meter, the improvement as defined in claim 8 wherein the driving pawl is spring-biased to rotate in a direction for movement of the ratchet wheel in said one direction and which includes coin-actuated means connected to the driving pawl for rotation thereof in an opposite direction, said coin-actuated means being operable by a hand-held coin.

12. In a parking meter, the improvement as defined in claim 8 wherein the driving pawl is spring-biased to rotate in a direction for movement of the ratchet wheel in said one direction and which includes coin-actuated means connected to the driving pawl for rotation thereof in an opposite direction to a starting position, said coin-actuated means being operable by a hand-held coin and latch means engaging with and holding the driving pawl in said starting position, said latch means being operable to release the driving pawl from said starting position by the coin being deposited in the meter.

13. In a parking meter, the improvement comprising indicating means including a signal flag, said signal flag being biased toward a violation indicating position thereof and being movable to a plurality of purchased-time indicating positions; means for advancing the signal flag to a purchased-time indicating position thereof, said means including a rotatable ratchet wheel, said ratchet wheel advancing the signal flag upon movement thereof in one direction, a driving pawl movable relative to the ratchet wheel, said driving pawl being engageable with the ratchet wheel for moving the ratchet wheel in said one direction; means for supporting a coin deposited in the meter at a fixed position in the meter; means for determining the value of a coin deposited in the meter, said means including a movable member engaging with the edge of the coin at said fixed position; and stop means carried by said movable member for engaging with and releasing the driving pawl from the ratchet wheel at a point where the movement of the ratchet wheel and signal flag under the influence of the driving pawl corresponds in time purchased to the value of the coin at said fixed position.

14. In a parking meter, the improvement as defined in claim 13 which includes coin-actuated means for moving the driving pawl to a starting position for engagement with the ratchet wheel, said coin-actuated means being operable by a hand-held coin and means for releasing the preceding coin from said fixed position upon movement of the driving pawl to said starting position.

15. In a parking meter, the improvement as defined in claim 13 which includes timing means for controlling the biased movement of the signal flag from a purchased-time position toward a violation position at a timed rate, said timing means including a timer and a slip clutch connecting the timer to the ratchet wheel, said clutch permitting movement of the ratchet wheel in said one direction independently of the timer.

16. In a parking meter, the improvement as defined in claim 13 which includes an arresting pawl, engaging with the ratchet wheel and preventing movement of the ratchet wheel after release of the driving pawl from engagement therewith.

17. In a parking meter, the combination of a visible indicator, said indicator including a pair of unbalanced signal flags, said signal flags being biased by the unbalanced condition thereof toward a violation indicating position and being movable to purchased-time indicating positions thereof, means for rotating said flags in one direction from said violation position to said purchased-time indicating positions, said means including a rotatable ratchet wheel connected to said flags, a carrier rotatable relative to the ratchet wheel, said carrier being spring-biased to rotate in one direction, a driving pawl pivoted on the carrier, said driving pawl being engageable with the ratchet wheel for moving the ratchet wheel and the signal flags upon movement of the carrier in said one direction, and means for limiting said movement of the ratchet wheel and the signal flags to a position indicating a purchase of time corresponding to the value of a coin deposited in the meter, said last-mentioned means including a movable stop plate having a plurality of stops thereon, said stops being located so as to engage with and release the driving pawl from engagement with the ratchet wheel at different positions thereof depending on the value of the coin and means for measuring the coin and setting the movement limiting means with the stop corresponding to the coin measured in position to engage with the driving pawl.

18. In an automatic parking meter of the progressive type having a housing with a coin slot therein and a visible signal which is movable between a violation indicating position and various purchased-time indicating position in the operation of the meter, the improvement which comprises a rotatable ratchet wheel connected to the signal, said ratchet wheel advancing the signal to a purchased-time indicating position upon rotation thereof in one direction, a carrier rotatable relative to ratchet wheel, said carrier being spring-biased for rotation in said one direction, a driving pawl pivotally carried on the carrier, said driving pawl being movable into and out of engagement with the ratchet wheel and being spring-biased into engagement therewith, a latch engaging with and holding the driving pawl out of engagement with the ratchet wheel, coin-receiving means for supporting a coin in a fixed position within the housing, a rotatable hammer, said hammer being spring-biased to engage with the edge of the coin at said fixed position, coin-actuated means for rotating the carrier and the hammer to cocked positions thereof, said coin-actuated means being operable by insertion of a coin into the coin slot in the housing, a latch engaging with and holding the carrier in the cocked positions thereof, a second latch engaging with and holding the hammer in the cocked position thereof, a coin operated trigger for releasing the hammer latch, means controlled by the hammer for releasing the carrier and driving pawl latches, and a series of spaced stops carried by the hammer for engaging with and releasing the driving pawl from engagement with the ratchet wheel, said stops being arranged to engage with the driving pawl upon an arcuate movement of the driving pawl and the ratchet wheel which corresponds in time to the value of the coin at the fixed position.

19. In an automatic parking meter of the progressive type, the improvement as defined in claim 18 wherein the stops carried by the hammer are formed on a plate and the plate is removably secured to the hammer.

20. In an automatic parking meter of the progressive type, the improvement as defined in claim 18 which includes means for holding the driving pawl out of engagement with the ratchet wheel until the carrier has moved a predetermined distance from the cocked position thereof.

21. In an automatic parking meter of the progressive type, the improvement as defined in claim 18 wherein the ratchet wheel has a long tooth and a series of shorter teeth for engagement with the driving pawl and which includes means for holding the driving pawl out of engagement with the shorter teeth until the carrier has moved a predetermined distance from the cocked position thereof, said pawl holding means permitting the driving pawl to engage with the long tooth.

22. In a parking meter having a movable indicator, said indicator having a violation position, means for advancing the indicator to a position indicating the purchase of parking time, said advancing means including a movable ratchet member connected to the indicator, a movable carrier, movable means for connecting the carrier and ratchet member for effecting movement of the ratchet member with the carrier on movement of the latter in one direction, movable means for measuring the size of a coin deposited in the meter, and cooperating stop means associated with said movable coin measuring means and said movable connecting means, said stop means being engageable with and operating said connecting means to disconnect said carrier and ratchet on movement of said carrier in said one direction, said stop means being so constituted as to operate said connecting means to disconnect said carrier and ratchet at a point in the movement of the latter in said one direction where the indicator indicates the purchase of a time increment corresponding to the value of the coin measured by said movable coin measuring means.

23. A parking meter as set forth in claim 22, wherein the stop means associated with one of said movable means comprises a stop plate removably secured thereto and provided with a plurality of stops.

24. A parking meter as set forth in claim 22, wherein the carrier is biased for movement in said one direction, and coin operated means are provided for moving the carrier in the opposite direction.

25. A parking meter as set forth in claim 22, wherein coin operating means are provided for rendering the connecting means ineffective to connect the ratchet member and carrier during insertion of a coin in the meter.

26. A parking meter as set forth in claim 22, having said carrier and coin measuring means biased respectively for movement in said one direction and toward coin measuring position and movable in the opposite direction to cocked positions, coin operated means for moving said carrier and coin measuring means to said cocked positions, and other coin operated means for sequentially releasing said coin measuring means and carrier from their cocked positions.

27. A parking meter as set forth in claim 22, wherein said stop means includes a stop operable in response to insertion of a coin of less than a predetermined size for operating said connecting means to disconnect said carrier and ratchet member prior to movement of said indicator by the ratchet member to a time purchased position.

28. A parking meter as set forth in claim 22, including means for moving said carrier and coin measuring means respectively in the opposite direction and away from coin measuring position to cocked positions, means for latching said carrier and said member in said cocked positions, means operable on movement of said carrier to cocked position for conditioning said connecting means for connecting said carrier and ratchet member on movement of said carrier in said one direction from cocked position, and coin controlled means for sequentially releasing said coin measuring member from cocked position, releasing said carrier from cocked position, and for operating said connecting means to disconnect the carrier from the ratchet member on engagement of said cooperating stop means.

29. A parking meter as set forth in claim 22, including arresting pawl means associated with said carrier and ratchet member for normally preventing movement of said ratchet member and indicator toward time-purchased position relative to said carrier, and coin operated means for rendering said arresting pawl means ineffective during insertion of a coin in the meter.

30. A parking meter as set forth in claim 22, wherein indicator operated means are provided for operating said connecting means to disconnect said carrier and ratchet member, said indicator operated means being engageable and operated by the indicator on movement of the latter in time-purchased direction by a predetermined amount.

31. A parking meter as set forth in claim 22 including means connected to the indicator for biasing the latter and said ratchet member toward violation position from a time-purchased position, timer means for positioning the ratchet member and controlling the movement of the latter toward violation position at a timed rate, and a lost motion connection between the biased indicator and ratchet member operable when the meter is subjected to severe vibration for permitting limited vibration of the indicator independently of the ratchet member and preventing movement of the ratchet member from its timer-determined position by said biased indicator.

32. A parking meter as set forth in claim 22 wherein the stop means includes stops operable in response to the measurement of different coins of selected sizes to operate the connecting means to disconnect the carrier and ratchet member at points in the movement of the ratchet member where the indicator indicates the purchase of a time increment corresponding to the value of the measured coin and operable in response to the measurement of a coin of other than said selected sizes for operating connecting means to disconnect the carrier and ratchet member prior to movement of the indicator in time purchasing direction.

33. In a coin-operated time-measuring and indicating apparatus of the type having an indicator which is movable by deposit of coins between various purchased-time positions and a violation position, the improvement which comprises coin-operated driving means for moving an indicator to various purchased-time indicating positions thereof, said driving means being engageable with the indicator under the influence of a deposited coin and including an operating lever for releasing the indicator from engagement therewith, and means for engaging said operating lever and releasing the indicator from the driving mechanism at a purchased-time position corresponding to the value of the coin, said releasing means including a movable plate positioned for engagement with the periphery of the coin and being movable to different positions by coins of different diameters and a series of stop members carried by said plate, said stop members being located in different positions on said plate with the respective members being positioned for engagement with the drive operating and releasing member at a point where a change in the purchased-time position of the indicator corresponds to the time allotted to a coin of the diameter engaged by the plate.

34. In a coin-operated time-measuring and indicating mechanism of the type having an indicator which is movable between various purchased-time indicating positions and a violation position and has a drive releasably engaging with the indicator for moving the indicator to said purchased-time positions, the improvement which comprises means for controlling the operation of said drive in accordance with the value of a deposited coin regardless of the relationship as to value between coins of different diameters, said means including a movable plate engaging with the periphery of a deposited coin and a series of stop members carried by said plate, said stop members being located in different positions on said plate with the respective stop members being positioned for engagement with a drive operating and releasing member at a point where a change in the purchased-time position of the indicator corresponds to the time allotted to a coin of the diameter engaged by the movable plate.

References Cited in the file of this patent

UNITED STATES PATENTS 2,532,901　Hale ---------------- Dec. 5, 1950

U. S. DEPARTMENT OF COMMERCE
PATENT OFFICE

CERTIFICATE OF CORRECTION

Patent No. 2,831,557     James O. Eames et al.     April 22, 1958

It is hereby certified that error appears in the printed specification of the above numbered patent requiring correction and that the said Letters Patent should read as corrected below.

Column 5, line 22, for "reaches it" read -- reaches its --; column 6, line 55, for "surface 55" read -- surface 57 --; column 13, line 75, for "with ratchet" read -- with the ratchet --; column 18, line 75, list of references cited, for the patent number "2,532,901" read --2,532,906--.

Signed and sealed this 3rd day of June 1958.

(SEAL)
Attest:

KARL H. AXLINE
Attesting Officer

ROBERT C. WATSON
Commissioner of Patents